United States Patent
Nuopponen et al.

(10) Patent No.: US 10,808,356 B2
(45) Date of Patent: Oct. 20, 2020

(54) METHOD AND A DEVICE FOR PRODUCING NANOFIBRILLAR CELLULOSE

(71) Applicant: UPM-KYMMENE CORPORATION, Helsinki (FI)

(72) Inventors: Markus Nuopponen, Helsinki (FI); Juha Tamper, Taipalsaari (FI); Taisto Tienvieri, Vantaa (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 734 days.

(21) Appl. No.: 14/890,392

(22) PCT Filed: May 13, 2014

(86) PCT No.: PCT/FI2014/050357
§ 371 (c)(1),
(2) Date: Nov. 10, 2015

(87) PCT Pub. No.: WO2014/184438
PCT Pub. Date: Nov. 20, 2014

(65) Prior Publication Data
US 2016/0102433 A1   Apr. 14, 2016

(30) Foreign Application Priority Data
May 14, 2013   (FI) .................................... 20135515

(51) Int. Cl.
*D21C 9/00* (2006.01)
*D21H 11/18* (2006.01)
(Continued)

(52) U.S. Cl.
CPC .............. *D21C 9/007* (2013.01); *C08B 15/08* (2013.01); *D21D 1/004* (2013.01); *D21D 1/006* (2013.01);
(Continued)

(58) Field of Classification Search
CPC ......... D21C 9/001; D21C 9/002; D21C 9/007
See application file for complete search history.

(56) References Cited

U.S. PATENT DOCUMENTS 4,374,702 A   2/1983   Turbak et al.
4,481,077 A   11/1984   Herrick
(Continued)

FOREIGN PATENT DOCUMENTS

CN   101511483 A   8/2009
CN   102639786 A   8/2012
(Continued)

OTHER PUBLICATIONS

Bharimalla et al., Micro/Nano-fibrillated Cellulose from Cotton Linters as Strength Additive in Unbleached Kraft Paper: Experimental, Semi-empirical, and Mechanistic Studies., 2017, Bioresources, 12(3), p. 5682-5696.*

(Continued)

*Primary Examiner* — Anthony Calandra
(74) *Attorney, Agent, or Firm* — Nixon Peabody LLP (57) ABSTRACT

In a method for producing nanofibrillar cellulose, cellulose based fiber material in dispersion is processed for separating fibrils. The method includes a first step where the fiber material is supplied to a disperser, where it flows through several counter-rotating rotors in such a way that the material is repeatedly subjected to shear and impact forces by the effect of the different counter-rotating rotors, and a second step, where the fiber material obtained from the first step is supplied to a homogenizer, where it is subjected to homogenization by the effect of pressure.

27 Claims, 2 Drawing Sheets

(51) Int. Cl.
*D21D 1/00* (2006.01)
*D21D 1/20* (2006.01)
*C08B 15/08* (2006.01)
*D21H 21/18* (2006.01)
*D21H 17/25* (2006.01)

(52) U.S. Cl.
CPC .............. *D21D 1/20* (2013.01); *D21H 11/18* (2013.01); *D21H 17/25* (2013.01); *D21H 21/18* (2013.01)

(56) References Cited

U.S. PATENT DOCUMENTS

| | | | |
|---|---|---|---|
| 5,964,983 | A | 10/1999 | Dinand et al. |
| 6,202,946 | B1* | 3/2001 | Virtanen ............... B02C 13/205 241/21 |
| 6,602,994 | B1 | 8/2003 | Cash et al. |
| 2005/0272836 | A1* | 12/2005 | Yaginuma ................. A23F 3/40 524/27 |
| 2008/0057307 | A1 | 3/2008 | Koslow et al. |
| 2014/0014283 | A1* | 1/2014 | Lindstrom ............. D21H 11/18 162/19 |

FOREIGN PATENT DOCUMENTS

| | | |
|---|---|---|
| JP | 2000-017592 A | 1/2000 |
| JP | 2009-161893 A | 7/2009 |
| WO | 98/20596 A1 | 5/1998 |
| WO | 99/54045 A1 | 10/1999 |
| WO | 9954045 A1 | 10/1999 |
| WO | 20051005726 A1 | 1/2005 |
| WO | 2007091942 A1 | 1/2007 |
| WO | 2007/091942 A1 | 8/2007 |
| WO | 20081027096 A1 | 3/2008 |
| WO | 2009021688 A1 | 2/2009 |
| WO | 20091021688 A1 | 2/2009 |
| WO | 20101092239 A1 | 8/2010 |
| WO | 2012168562 A1 | 12/2012 |
| WO | 20121168562 A1 | 12/2012 |
| WO | 2013121108 A1 | 2/2013 |

OTHER PUBLICATIONS

Wegner et al., A Fundamental Review of the Relationships between Nanotechnology and Lignocellulosic Biomass, 2009, Blackwell Publishing, chapter 1 of The Nanoscience and Technology of Renewable Biomaterials. (Year: 2009).*

Microfluidics, M-110Y Microfluidizer Materials Processor, May 2014 [downloaded online Jan. 6, 2020]. (Year: 2014).*

Tanja Zimmermann, et al., Properties of nanofibrillated cellulose from different raw materials and its reinforcement potential, Carbohydrate Polyers, 79 (2010), 1086-1093.

Product brochure from Kinematica AG, Dispersing Technology in the Laboratory, System MEGATRON® MT 3000—Inline Homogenizer, HighEnd Line.

Nazia Siddiqui, Characterization of mechanically and enzymatically produced cellulose nanofibers from wood pulp, A Thesis, The Graduate school, The University of Maine, Dec. 2008, section 3.6 (p. 68-73).

Tom Lundin, Tailoring Pulp Fibre PropeÄrties in Low Consistency Refining, Laboratory of Fibre and Cellulose Technology, Faculty of Technology, Åbo Akademi University, Turku/Åbo, 2008 p. 99-103.

Notice of Opposition from European Application No. 14727224.9 dated Nov. 14, 2017.

Sep. 22, 2014 International Search Report issued in International Patent Application No. PCT/FI2014/050357.

May 5, 2015 International Preliminary Report on Patentability issued in International Patent Application No. PCT/FI2014/050357.

Chinese Patent Office, First Office Action for Chinese Patent Application No. 201480027535.6, dated Jul. 21, 2016, with English translation (10 pages total).

Japanese Patent Office, First Office Action in Japanese Patent Application No. 2016-513413, dated Apr. 17, 2018, with English translation (13 pages).

* cited by examiner

METHOD AND A DEVICE FOR PRODUCING NANOFIBRILLAR CELLULOSE

FIELD OF THE INVENTION

The invention relates to a method for producing nanofibrillar cellulose, wherein cellulose based fiber material is supplied into a refining gap for separating fibrils.

BACKGROUND OF THE INVENTION

In the refining of lignocellulose-containing fibers by, for example, a disc refiner or a conical refiner at a low consistency of about 3 to 4%, the structure of the fibre wall is loosened, and fibrils or so-called fines are detached from the surface of the fiber. The formed fines and flexible fibers have an advantageous effect on the properties of most paper grades. In the refining of pulp fibers, however, the aim is to retain the length and strength of the fibers. In post-refining of mechanical pulp, the aim is partial fibrillation of the fibers by making the thick fiber wall thinner by refining, for detaching fibrils from the surface of the fiber.

Lignocellulose-containing fibers can also be totally disintegrated into smaller parts by detaching fibrils which act as components in the fiber walls, wherein the particles obtained become significantly smaller in size. The properties of so-called nanofibrillar cellulose thus obtained differ significantly from the properties of normal pulp. It is also possible to use nanofibrillar cellulose as an additive in papermaking and to increase the internal bond strength (interlaminar strength) and tensile strength of the paper product, as well as to increase the tightness of the paper. Nanofibrillar cellulose also differs from pulp in its appearance, because it is gel-like material in which the fibrils are present in a water dispersion. Because of the properties of nanofibrillar cellulose, it has become a desired raw material, and products containing it would have several uses in industry, for example as an additive in various compositions.

Nanofibrillar cellulose can be isolated as such directly from the fermentation process of some bacteria (including *Acetobacter xylinus*). However, in view of large-scale production of nanofibrillar cellulose, the most promising potential raw material is raw material derived from plants and containing cellulose fibers, particularly wood and fibrous pulp made from it. The production of nanofibrillar cellulose from pulp requires the decomposition of the fibers further to the scale of fibrils.

The production of nanofibrillar cellulose from cellulose fibers of the conventional size class has been implemented by disc refiners of laboratory scale, which have been developed for the needs of food industry. This technique requires several refining runs in succession, for example 2 to 5 runs, to obtain the size class of nanocellulose. The method is also poorly scalable up to industrial scale.

It also known to disintegrate fibrous raw material to the level of nanofibrillar cellulose by homogenization. In this process, a cellulose fiber suspension is passed several times through a homogenization step that generates high shear forces on the material. For example in U.S. Pat. No. 4,374,702, this is achieved by passing the suspension under high pressure repeatedly through a narrow gap where it achieves a high velocity, after which it impinges on an impact surface that decelerates the velocity. U.S. Pat. No. 4,481,077 discloses a method applying the homogenizer of said patent, wherein additives are admixed into the pulp before homogenization. The homogenization of fiber pulp consisting of a cellulose derivative, for the production of nanofibrillar cellulose is, in turn, known from U.S. Pat. No. 6,602,994.

In practice, compromises have to be made in the homogenization upon producing nanofibrillar cellulose: for good fibrillation, high input power/pulp flow rate is needed, which, in turn, decreases the productivity with the available homogenizer power. It is, for example, known to pass pulp several times through a homogenizer, to achieve a desired degree of fibrillation. Another problem with the processing of fiber-containing pulp is the susceptibility of homogenizers to clogging due to their structure, which may occur even at relatively low consistencies (1 to 2%).

BRIEF SUMMARY OF THE INVENTION

It is an aim of the invention to eliminate the above-mentioned drawbacks and to present a method by which nanofibrillar cellulose can be made with a good capacity and also at a higher consistency.

The method comprises two steps. In the first step, the fiber material is supplied to a disperser, where it flows through several counter-rotating rotors, outwards in the radial direction with respect to the axis of rotation of the rotors in such a way that the material is repeatedly subjected to shear and impact forces by the effect of the different counter-rotating rotors. In the second step, the fiber material obtained from the first step is supplied to a homogenizer, where it is subjected to homogenization by the effect of pressure. Both steps are performed to aqueous dispersion of the fiber material at a suitable consistency. The second step can be performed at the same consistency as the first step, or the aqueous fiber material dispersion obtained from the first step is diluted to a suitable consistency for the second step.

In the first step, the fiber material can be reduced at least partly to nanofibrillar cellulose by the counter-rotating rotors without a risk to clogging by full-sized fibers not yet disintegrated. The fiber material is subjected to a series of frequently repeated impacts having varying directions of action as it flows through the rotors. The first step can be performed at a high consistency, even up to 8 wt-%. The first step has a high energy efficiency. In the second step, the material from the first step, being still non-homogeneous and containing fiber material of differing sizes, such as fibrils and fiber fragments not yet disintegrated to fibrils, can be homogenized under pressure to a uniform gel of nanofibrillar cellulose in a homogenizer without risk of clogging. The material that has been treated in the first step can be fed at a higher consistency than normally to the second step, which reduces the overall energy consumption.

In each steps, the dispersion of fiber material can be passed through the device once, or the passage can be repeated. The total number of passages is 1-3 through the respective device. In the first step in a disperser, the fiber material in dispersion is repeatedly impacted by the blades or ribs of the rotors striking it from opposite directions when the blades rotate at the rotating speed and at the peripheral speed determined by the radius (distance to the rotation axis) in opposite directions. Because the fiber material is transferred outwards in the radial direction, it crashes onto the wide surfaces of the blades, i.e. ribs, coming one after each other at a high peripheral speed from opposite directions; in other words, it receives several successive impacts from opposite directions. Also, at the edges of the wide surfaces of the blades, i.e. ribs, which edges form a blade gap with the opposite edge of the next rotor blade, shear forces occur, which contribute to the disintegration of the fibers and detachment of fibrils. The impact frequency is determined by the rotation speed of the rotors, the number of the rotors, the number of blades in each rotor, and the flow rate of the dispersion through the device.

In the second step in a homogenizer, the homogenization of the fiber material dispersion to nanofibrillar cellulose is caused by forced through-flow of the dispersion, which disintegrates the material to fibrils. The fiber material dispersion is passed at a given pressure through a narrow through-flow gap where an increase in the linear velocity of the dispersion cause shearing and impact forces on the dispersion, resulting in the removal of fibrils from the fiber material. The fiber fragments, the largest parts that still exist in the dispersion after the first step are disintegrated into fibrils in the second step. On the other hand, these fiber fragments are small enough so that they do not clog the homogenizer.

The fiber material to be processed is preferably such cellulose in which the internal bonds of the fiber have already been weakened by chemical or enzymatic pretreatment of the cellulose.

Such material is easy to disintegrate to fiber fragments and fibrils by impacts already in the first step. The chemical pretreatment may be adsorption of a chemical, especially a cellulose derivative, to the fibers, or chemical modification of the cellulose constituent of the fibers. For example adsorption of carboxymethyl cellulose (CMC) to the cellulose structure can be performed in accordance with the technique described in publication WO2010/092239. The enzymatic pretreatment can be a mild treatment of the fiber material with a wood-degrading enzyme, such as cellulase. Further, the cellulose of the fiber material can be chemically modified cellulose where functional groups are introduced in the cellulose chain. Such groups include, for example, carboxyl groups (anionically modified cellulose) or quaternary ammonium (cationically modified cellulose). Carboxyl groups can be provided in cellulose molecules in a known way by, for example, N-oxyl mediated catalytic oxidation of cellulose, by using a suitable N-oxyl catalyst which oxidizes primary alcohol groups of the cellulose anhydroglucose units to carboxyl groups, for example 2,2,6,6-tetramethyl-1-piperidine-N-oxide (TEMPO). The methods for N-oxyl mediated oxidation of the cellulose in fiber material are disclosed e.g. in publication WO2012/168562. The anionically modified cellulose can also be carboxymethylated cellulose, in which carboxymethyl groups are attached to the alcohol groups of the cellulose with such a low degree of substitution that the cellulose remains solid (insoluble in water).

Fiber material where the structure of the cellulose has been weakened or "labilized" in some of the aforementioned ways can already be influenced well in the first step in the disperser by impacts which come from blades in opposite directions and which can be produced by a series of successive rotors, and by shear forces generated at the edges of the blades when the fibers are transferred from the range of action of one rotor to the range of action of the next rotor. The formation of nanofibrillar cellulose aqueous dispersion can be completed in the successive processing in the homogenizer, which yields a uniform aqueous gel-like dispersion of cellulose fibrils, which can be characterized by high viscosity values at low shear stress values and which can be seen by visual analysis as a clear gel without turbidity caused by fiber fragments.

If the fiber material that is subjected to the first step and the second step is non-modified, that is, the initial internal strength of the cellulose is preserved, the fibers are preferably pre-refined. The fibers are prerefined to SR number over 70, preferably over 80.

Furthermore, the separation of fibrils works well in the first step in the disperser when the pH of the fiber material dispersion is in the neutral or slightly alkaline range (pH 6 to 9, advantageously 7 to 8). An elevated temperature (higher than 30° C.) also contributes to the fibrillation. With respect to the temperature, the normal operating environment for processing is usually 20 to 60° C. The temperature is advantageously between 35 and 50° C.

In the second step in the homogenizer, the homogenization pressure applied during is 200 to 1000 bar, advantageously 300 to 650 bar. The pressure is most preferably in the range of 310-450 bar. The pressure applied is relatively low compared with values generally suggested by literature, due to the first step, which means lower energy consumption.

In the homogenizer the pH values can be the same as in the disperser. The temperature is not allowed to rise above 90° C.

The consistency where the fiber material dispersion is treated is preferably 1-8 wt-%, more preferably 2-5 wt-%. For the energy efficiency and the production output, it is preferable to use the consistency of at least 3 wt-% in the above-mentioned ranges. The consistency is preferably 3-4.5%, the optimum being 3-4%.

The fiber material is treated in the above-mentioned consistencies at least in the first step. In the second step, the treatment can be continued in the same consistency as in the first step, or it can be diluted to a lower consistency. If the dispersion is diluted, the consistency is, however, at least 1.5%, preferably at least 2 wt-% in the second step. The consistency in the second step is preferably 1.5-6 wt-%, most preferably 2.5-4 wt-%. The optimum consistency in the second step is dependent on the chemical or enzymatic pretreatment of the cellulose.

In each step, the same fiber material dispersion is passed through the device 1-3 times. Between the steps, the fiber material dispersion may be diluted, but for the simplicity of process, it is preferred that the fiber material is treated in the same consistency both in the first step and in the second step.

DESCRIPTION OF THE DRAWINGS

In the following, the invention will be described in more detail with reference to the appended drawings, in which.

DETAILED DESCRIPTION OF THE INVENTION

In the following disclosure, all percent values are by weight, if not indicated otherwise. Further, all numerical ranges given include the upper and lower values of the ranges, if not indicated otherwise.

In the present application all results shown and calculations made, whenever they are related to the amount of pulp, are made on the basis of dried pulp.

In this application, nanofibrillar cellulose refers to cellulose microfibrils or microfibril bundles separated from cellulose based fiber raw material. These fibrils are characterized by a high aspect ratio (length/diameter): their length may exceed 1 μm, whereas the diameter typically remains smaller than 200 nm. The smallest fibrils are in the scale of so-called elementary fibrils, the diameter being typically 2 to 12 nm. The dimensions and size distribution of the fibrils depend on the refining method and efficiency. Nanofibrillar cellulose can be characterized as a cellulose based material, in which the median length of particles (fibrils or fibril bundles) is not greater than 10 μm, for example between 0.2 and 10 μm, advantageously not greater than 1 μm, and the particle diameter is smaller than 1 μm, suitably ranging from 2 nm to 200 nm. Nanofibril cellulose is characterized by a large specific surface area and a strong ability to form hydrogen bonds. In water dispersion, nanofibrillar cellulose typically appears as either light or almost colourless gel-like material. Depending on the fiber raw material, nanofibril cellulose may also contain small amounts of other wood components, such as hemicellulose or lignin. Often used parallel names for nanofibrillar cellulose include nanofibrillated cellulose (NFC), which is often simply called nanocellulose, and microfibrillated cellulose (MFC).

In this application, the term "fibrillation" generally refers to disintegrating fiber material mechanically by work applied to the particles, where cellulose fibrils are detached from the fibers or fiber fragments.

The fiber material dispersion that is subjected to fibrillation is a mixture of fiber material and water. The term "pulp" is also used for the mixture of fiber raw material and water. The fiber material dispersion may refer generally to whole fibers, parts (fragments) separated from them, fibril bundles, or fibrils mixed with water, and typically the fiber material dispersion is a mixture of such elements, in which the ratios between the components are dependent on the degree of processing.

The modified or pretreated fiber material that is used as the starting material can be based on any plant material that contains cellulose. The plant material may be wood. The wood can be from softwood trees such as spruce, pine, fir, larch, douglas-fir or hemlock, or from hardwood trees such as birch, aspen, poplar, alder, eucalyptus or acasia, or from a mixture of softwood and hardwood. Nonwood material can be from agricultural residues, grasses or other plant substances such as straw, leaves, bark, seeds, hulls, flowers, vegetables or fruits from cotton, corn, wheat, oat, rye, barley, rice, flax, hemp, manila hemp, sisal hemp, jute, ramie, kenaf, bagasse, bamboo or reed.

First Step (Disperser)

Figure 1:
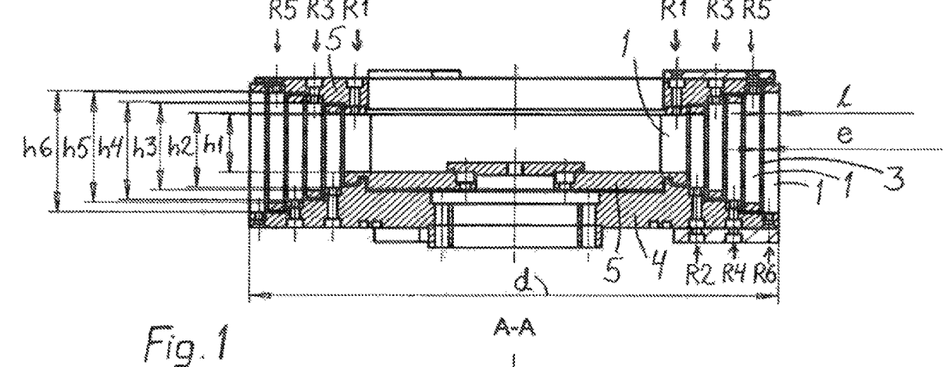
FIG. 1 shows the device used in the first step in a sectional plane A-A coinciding with the axis of rotation of the rotors.
Figure 2:
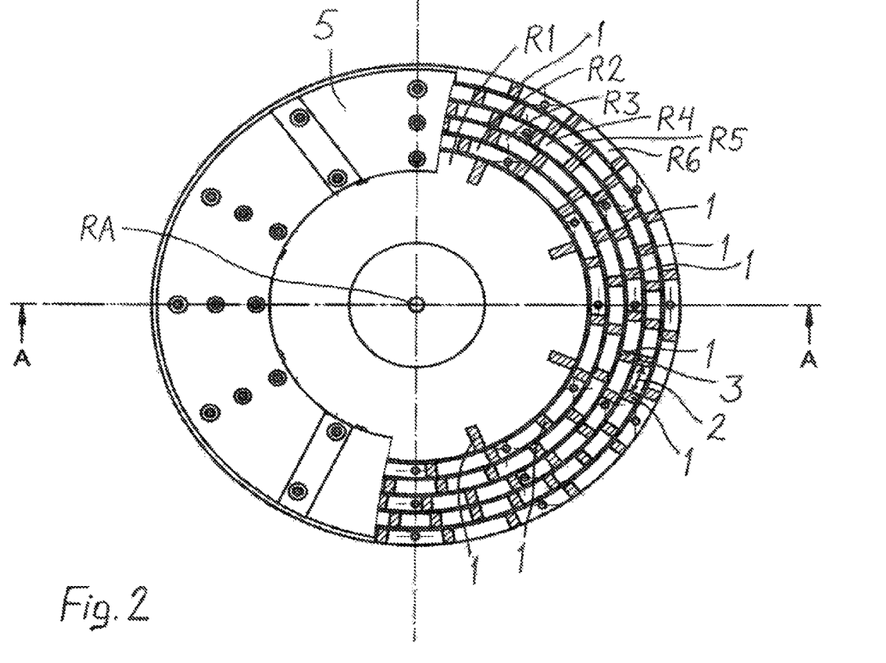
FIG. 2 shows the device of FIG. 1 in a partial horizontal section.

The disperser used in the first step is shown in FIGS. 1 and 2. It comprises several concentric rotors R1, R2. arranged to rotate in opposite directions On the periphery of each rotor, there are several blades which, together with several blades of the preceding and/or next rotor in the radial direction, because of their rotary movement in opposite directions, repeatedly produce several narrow blade spaces or gaps, in which the fibers are also subjected to shear forces as the opposite edges of the blades, i.e. ribs, pass each other at a high speed when moving into opposite directions.

It can be stated that in each pair of counter-rotating rotors, a large number of narrow blade gaps and, correspondingly, reversals of impact directions, are generated during a single rotation of each rotor, the recurrence frequency being proportional to the number of blades i.e. ribs on the periphery. Consequently, the direction of impacts caused by the blades i.e. ribs on the fiber material is changed at a high frequency. The number of blade gaps during the rotations and their recurrence frequency depend on the density of the blades distributed onto the periphery of each rotor, and correspondingly on the rotation speed of each rotor. The number of such rotor pairs is n−1, where n is the total number of rotors, because one rotor always forms a pair with the next outer rotor in the radial direction, except for the outermost rotor, through which the processed pulp exits the refining process.

Different rotors may have different numbers of blades i.e. ribs, for example in such a way that the number of blades increases in the outermost rotors. The number of blades i.e. ribs can also vary according to another formula.

The density of the blades/ribs on the periphery of each rotor, as well as the angles of the blades to the radial direction, as well as the rotation speeds of the rotors can be used to affect the refining efficiency (the refining intensity) as well as the throughput time of the fiber material to be refined.

The fibrillation method based on impacts coming at a high frequency from different directions is particularly suitable for such cellulose based fiber materials, in which the internal bonds of the cellulose have been weakened in a pretreatment. The pre-treated cellulose can especially be anionically modified, such as carboxymethylated or oxidized (e.g. N-oxyl mediated oxidizations), or cationically modified.

The advantage of the first step is that it can be used for fibrillating whole-size fibers at higher consistencies (even up to 8 wt-%), compared with e.g. a homogenizer. The density of the blades/ribs can be adjusted to correspond to the consistency used at the time.

The supplying can be implemented so that the fiber material dispersion to be passed through the rotors contains a given volume part of a gaseous medium mixed in it, but as a separate phase, for example greater than 10 vol. %. For intensifying the separation of the fibrils, the content of gas is at least 50 vol. %, advantageously at least 70% and more advantageously between 80 and 99%; that is, expressed in degrees of filling (the proportion of the fiber material dispersion to be processed in the volume passing through the rotor) lower than 90 vol. %, not higher than 50%, not higher than 30% and correspondingly between 1 and 20%. The gas is advantageously air, wherein the fiber suspension to be processed can be supplied in such a way that a given proportion of air is admixed to the fiber suspension.

The method is also advantageous in the sense that it can be easily scaled larger, for example by increasing the number of rotors.

The device shown in FIG. 1 comprises several counter-rotating rotors R1, R2, R3 . . . placed concentrically within each other so that they rotate around a common rotation axis RA. The device comprises a series of rotors R1, R3 . . . rotating in the same direction, and rotors R2, R4 . . . rotating in the opposite direction, wherein the rotors are arranged pairwise so that one rotor is always followed and/or preceded in the radial direction by a counter-rotating rotor. The rotors R1, R3 . . . rotating in the same direction are connected to the same mechanical rotating means 5. The rotors R2, R4 . . . rotating in the opposite direction are also connected to the same mechanical rotating means 4 but rotating in a direction opposite to the direction of the aforementioned means. Both rotating means 4, 5 are connected to their own drive shaft which is introduced from below. The drive shafts can be located concentrically with respect to the rotation axis RA, for example in such a way that the outer drive shaft is connected to a lower rotating means 4, and the inner drive shaft placed inside it and rotating freely with respect to it, is connected to an upper rotating means 5.

The figure does not show the fixed housing for the device, inside which the rotors are placed to rotate. The housing comprises an inlet, through which material can be supplied from above to the inside of the innermost rotor R1, and an outlet located by the side, oriented approximately tangentially outwards with respect to the peripheries of the rotors. The housing also comprises through-holes for the drive shafts down below.

In practice, the rotors consist of vanes or blades 1 placed at given intervals on the periphery of a circle whose geometric centre is the rotation axis RA, and extending radially. In the same rotor, flow-through passages 2 are formed between the vanes 1, through which passages the material to be refined can flow radially outwards. Between two successive rotors R1, R2; R2, R3; R3, R4; etc., several blade spaces or gaps are formed repeatedly and at a high frequency during the rotary movement of the rotors in the opposite direction. In FIG. 2, reference numeral 3 denotes such blade gaps between the blades 1 of the fourth and fifth rotors R4, R5 in the radial direction. The blades 1 of the same rotor form narrow gaps, i.e. blade gaps 3, with the blades 1 of the preceding rotor (having the narrower radius on the periphery of the circle) in the radial direction and with the blades 1 of the next rotor (placed on the periphery of the circle with the greater radius) in the radial direction. In a corresponding manner, a large number of changes in the impact direction are formed between two successive rotors when the blades of the first rotor rotate in a first direction along the periphery of the circle, and the blades of the next rotor rotate in the opposite direction along the periphery of a concentric circle.

The first series of rotors R1, R3, R5 is mounted on the same mechanical rotating means 5 that consists of a horizontal lower disc and a horizontal upper disc, connected to each other by the blades 1 of the first rotor R1, innermost in the radial direction. On the upper disc, in turn, are mounted the blades 1 of the other rotors R3, R4 of this first series, with the blades 1 extending downwards. In this series, the blades 1 of the same rotor, except for the innermost rotor R1, are further connected at their lower end by a connecting ring. The second series of rotors R2, R4, R6 is mounted on the second mechanical rotating means 4 which is a horizontal disc placed underneath said lower disc, and to which the blades 1 of the rotors of the series are connected, to extend upwards. In this series, the blades 1 of the same rotor are connected at their upper end by a connecting ring. Said connecting rings are concentric with the rotation axis RA. The lower discs are further arranged concentrically by an annular groove and a matching annular protrusion on the facing surfaces of the discs, also placed concentrically with the rotation axis RA and being equally spaced from it.

FIG. 1 shows that the vanes or blades 1 are elongated pieces parallel to the rotation axis R1 and having a height greater than the width I (the dimension in the radial direction). In the horizontal section, the blades are quadrangular, in FIG. 2 rectangular. The fiber material is passed crosswise to the longitudinal direction of the blades, from the centre outwards, and the edges at the sides of the surfaces facing the radial direction in the blades 1 form long and narrow blade gaps 3 extending in the longitudinal direction of the blade, with the corresponding edges of the blades 1 of the second rotor.

The rotors R1, R2, R3 . . . are thus, in a way, through-flow rotors in the shape of concentric bodies of revolution with respect to the rotation axis, wherein their part that processes the fiber material consists of elongated vanes or blades 1 extending in the direction of the rotation axis RA, and of flow-through passages 2 left there between.

FIG. 1 also shows that the heights h1, h2, h3 . . . of the rotor blades 1 increase gradually from the first, i.e. the innermost rotor R1 outwards. As a result, the heights of the flow-through passages 2 limited by the rotor blades 1 also increase in the same direction. In practice, this means that when the cross-sectional area of the radial flow increases outwards as the peripheral length of the rotors increases, the increase in the height also increases this cross-sectional area. Consequently, the travel speed of a single fiber is decelerated in outward direction, if the volume flow is considered to be constant.

By the centrifugal force caused by the rotational movement of the rotors, the material to be processed is passed through the rotors with a given retention time.

As can be easily concluded from FIG. 2, during a single whole rotation of a pair of rotors (from a position in which given blades 1 are aligned, to the position in which the same blades 1 are aligned again), several blade gaps 3 are formed when successive blades 1 in the peripheral direction encounter successive blades 1 of the second rotor. As a result, the material transferred through the passages 2 outward in the radial direction is continuously subjected to shear and impact forces in the blade gaps 3 between different rotors and in the flow-through passages 2 between the blades 1 on the periphery of the rotor, when the material is passed from the range of the rotor to the range of an outer rotor, while the movement of the blades in peripheral direction and the directional changes of the movement caused by the rotors rotating in different directions prevent the through-flow of the material too fast out through the rotors by the effect of the centrifugal force.

Blade gaps 3 and, correspondingly, encounters of blades 1 and respective changes in the impact directions in two rotors successive in the radial direction are generated at a frequency of [1/s] which is $2 \times f_r \times n_1 \times n_2$, where $n_1$ is the number of blades 1 on the periphery of the first rotor, $n_2$ is the number of blades on the periphery of the second rotor, and $f_r$ is the rotational speed in revolutions per second. The coefficient 2 is due to the fact that the rotors rotate at the same rotational speed in opposite directions. More generally, the formula has the form $(f_r(1)+f_r(2)) \times n_1 \times n_2$, where $f_r(1)$ is the rotational speed of the first rotor and $f_r(2)$ is the rotational speed of the second rotor in the opposite direction.

Furthermore, FIG. 2 shows how the number of blades 1 may be different in different rotors. In the figure, the number of blades 1 per rotor increases starting from the innermost rotor, except for the last rotor R6 where it is smaller than in the preceding rotor R5. As the rotational speeds (rpm) are equal irrespective of the location and direction of rotation of the rotor, this means that the frequency at which the blades 3 pass a given point and, correspondingly, the frequency of formation of the blade gaps 3 increases from the inside outwards in the radial direction of the device.

In FIG. 1, the dimension 1 of the blades in the direction of the radius r is 15 mm, and the dimension e of the blade gap 3 in the same direction is 1.5 mm. Said values may vary, for example from 10 to 20 mm and from 1.0 to 2.0 mm, respectively. The dimensions are influenced by, for example, the consistency of the material to be processed.

The diameter d of the device, calculated from the outer rim of the outermost rotor R6, can vary according to the capacity desired. The diameter can be 500-1200 mm. The rotation speed of the rotors can be 1500-2000 rpm.

In the above described first step, the material to be processed for producing intermediate product for the second step is a mixture of water and cellulose based fiber material, known also as pulp. In the pulp, the fibers are separated from each other as a result of the preceding manufacturing processes of mechanical pulp or chemical pulp, known as mechanical pulping or chemical pulping, respectively. In these pulping processes the starting material is preferably wood raw material, but also other plant sources can be utilized.

The pulp is sufficiently dilute (1-6 wt-%) so that the starting material fibers can be supplied evenly and in sufficiently swollen state to open them up and to start the separation of the fibrils. It is also possible that the material is fiber material that has already passed the same process once or more times, and from which fibrils have already been separated. When the material is already partly gelled as a result of the preceding processing runs, the material can be run at the same relatively high consistency (in view of the gel-like state). However, it should be noted that thanks to the modification possibilities provided by the first step (inter alia, the blade density, the rotation speeds and, correspondingly, the peripheral speeds, impact frequencies, etc.), the consistency of the pulp to be processed may vary within a wide range, from 1 to 8%.

Fiber material at a given consistency in water is supplied in the above-described way through the rotors R1, R2, R3 . . . until it has attained the desired degree of fibrillation. If necessary, the processing is repeated once or twice several times by running the material through the rotors again. Alternatively, the material can be passed through similar devices connected in series to attain the desired number of passes.

Second Step (Homogenizer)

Homogenization is performed by subjecting the fiber material dispersion obtained in the first step to such a pressure that it flows at a high speed through a homogenizer. As a result of this, the fibers in the suspension are subjected to shearing and impact forces, which result in fibrillation and nanofibrillar cellulose with final desired properties.

The homogenization is performed at a relatively low consistency for the fiber material dispersion. As was described above, the fiber material dispersion from the first step can be diluted with water to achieve a suitably consistency for the second step, to safeguard the proper functioning of the device.

In this context, homogenization refers to homogenization caused by forced through-flow of the fiber material dispersion to be processed, wherein the material dispersed in it is disintegrated into smaller parts. The method presented in this context is not limited to the use of a homogenizer of a given type. However, it can be stated that in homogenization, the fiber suspension is passed at a given pressure through a narrow through-flow gap where an increase in the linear velocity causes shearing and impact forces on the dispersion, resulting in the complete fibrillation of the fiber material. The through-flow gap is annular, and there are many alternatives for its profile (cross-section in the direction transverse to the plane of the annulus). The disintegration of the material can be influenced by the profile of the flow-through gap. The flow-through gap is in a structure called a homogenizing valve.

Also, without limiting the method, it can be stated that the pulp to be homog-enized in the homogenizer is fed into the flow-through gap by a pump, wherein the homogenization pressure is the pressure developed in the pulp before the gap due to the resistance caused by the gap. This pressure can be adjusted by controlling the pressure at which said gap is pushed towards a closed position. The input power in the homogenizer is normally constant, wherein the volume flow (volume passed through per time) increases as the feeding pressure decreases.

Even though the fiber material obtained is the first step is rather inhomogeneous, it has smaller proportion of particles susceptible to cause clogging compared with the original fiber material dispersion. Therefore, the homogenization can be performed at higher consistencies as usual, which decreases the specific energy consumption (SEC), energy input per mass of material processed.

As in the first step, the processing in the second step can be repeated so that a desired number of passages is achieved.

After a sufficient number of homogenization passes (usually 1-3), a fibril cellulose dispersion which is a gel with strongly shear thinning properties, typical of nanofibrillar cellulose, is obtained. Complete fibrillation of the fibers and fiber fragments takes place in the second step. The quality of the nanofibrillar cellulose is a function of fiber material dispersion received from the first step and specific energy consumption in the second step.

Figure 3:
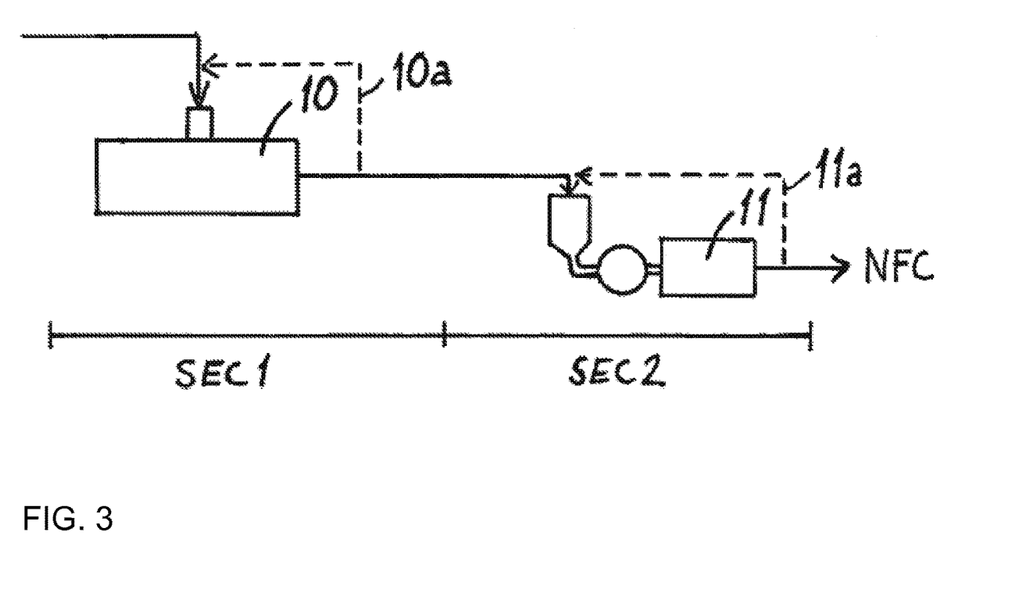
FIG. 3 shows schematically the general principle of the method, and FIG. 4a,b are the comparison of the products after the first step and the second step.

FIG. 3 shows both steps schematically. In the first step, the fiber material dispersion is passed through the disperser 10 which has the counter-rotating rotors R1, R2, R3 . . . as described above. One or more repeated passages 10a through the rotors of the disperser 10 are shown by broken line (connecting the outlet of the disperser to the inlet of the disperser). In the second step, the fiber material dispersion is passed through the homogenizer 11 according to the principle described above. One or more repeated passages 11a through the gap of the homogenizer 11 are shown by broken line (connecting the outlet of the homogenizer to the inlet of the homogenizer). In the first step, the total energy consumed to the processing of the fiber material suspension by the disperser 10 till it is ready to be supplied to the second step is SEC1, expressed as energy input per unit of mass (for example kWh/kg pulp or kWh/ton pulp), a variable known as specific energy consumption in mechanical pulping. SEC1 is preferably less than 1000 kWh/ton pulp. In the second step, the total energy consumed to the processing of the fiber material suspension by the homogenizer till it has the characteristics of the final nanofibrillar cellulose product, NFC, is SEC2. SEC2 is preferably 200-600 kWh/ton pulp per one pass. The total specific energy consumption of the method, SEC, is SEC1+SEC2. SEC is preferably below 2000 kWh/ton, more preferably below 1000 kWh/ton. The values vary depending on the treating consistency, homogenizing pressures used and the target quality of the nanofibrillar cellulose.

One possibility to arrange continuous production of the NFC through the first step and the second step is to connect in each step is to pass the material in the first step through two dispersers 10 connected in series and in the second step through one homogenizer 11, or through two homogenizers connected in parallel to ensure the capacity (the overall treatment for the fiber material being equivalent to 2 passes through the disperser and 1 pass through the homogenizer). Because low pressure can be used in the homogenizing, the throughput can be increased in the second step. It can be estimated that good quality NFC product can be obtained by this combination at a consistency of 4% using SEC which is below 1000 kWh/ton pulp.

A continuous production can be arranged by connecting dispersers in the first step in series and/or homogenizers in the second step in series so that the number of devices connected in series corresponds the required number of passes in each step. The outlet of the last disperser or only disperser of the first step can be connected directly to the inlet of the first homogenizer or the only homogenizer (or to the inlets of parallel-connected homogenizers) of the second step. it is preferable that in the continuous production, the fiber material dispersion is not diluted between the steps to avoid unnecessary intermediate process steps.

EXAMPLES

Example 1

Cellulose birch pulp was anionically modified by carboxymethylation to DS (degree of substitution) of 0.22.

The anionic pulp was dispersed to water to form 2% (w/w) dispersion. The dispersion was fed into a homogenizer (GEA Niro Soavi Panther) at 600 bar, but homogenizer was unable to fibrillate the sample because the machine is clogged because of long fibers.

Example 2

The carboxymethylated cellulose from example 1 was dispersed to water to consistency of 2.0% (w/w) and run 4 times through a disperser (Atrex), through its series of counterrotating rotors. The disperser used had a diameter of 850 mm and rotation speed used was 1800 rpm.

Viscosity of the final product was 15 300 mPas (Brookfield 10 rpm, measured at 0.8%) and turbidity 48 NTU (measured at 0.1%).

Example 3

Carboxymethylated cellulose from example 1 was dispersed to water to consistency of 2.0% (w/w) and run through the disperser (Atrex) 2 times in the same conditions as in example 2. After that the sample was diluted to 1% and it was run 3 more passes through the homogenizer (GEA Niro Soavi Panther). The homogenizing pressure was 600 bar.

Figure 4A:
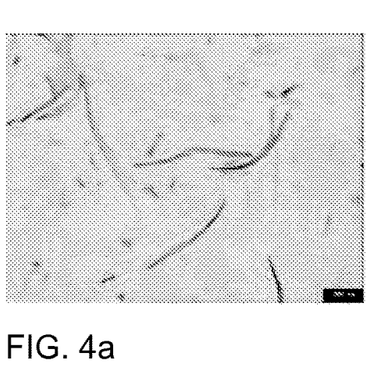
Figure 4B:
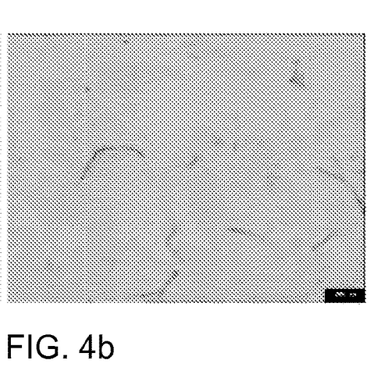

Viscosity of the final product was 18 800 mPas (Brookfield 10 rpm, 0.8%) and turbidity 43 NTU (0.1%). From optical microscopy pictures, FIGS. 4a and 4b, it can be seen that after the homogenizer treatment (FIG. 4b) the amount of unfibrillated fibers has decreased compared with sample obtained after 2 passes through the disperser.

Using the combination of disperser and homogenizer, the product is of better quality (higher viscosity and more transparent) than the product prepared with only the disperser (examples 2 and 3). Compared with the homogenizer alone as the device for fibrillation, the combination has better operational stability without risk of clogging.

Example 4

The carboxymethylated cellulose from Example 1 was dispersed to water to 1.5% (w/w) and run through the disperser (Atrex) 2 times in conditions specified above. After that the sample was run at the same consistency 1 more pass through the homogenizer (GEA Niro Soavi Panther) at 600 bar.

Viscosity of the final product was 13 400 mPas (Brookfield 10 rpm, 0.8%) and turbidity 37 NTU (0.1% solution).

When the turbidity is compared with example 2, is can be seen that treatment by the disperser only (4 passes) yielded 48 NTU, whereas the combination of two passes through the disperser and one pass through the homogenizer yielded more clear NFC dispersion (turbidity 37 NTU).

Characteristics of the Nanofibrillar Cellulose

In the present application the following methods are used for characterizing the nanofibrillar cellulose product.

Turbidity

Turbidity may be measured quantitatively using optical turbidity measuring instruments. There are several commercial turbidometers available for measuring quantitatively turbidity. In the present case the method based on nephelometry is used. The units of turbidity from a calibrated nephelometer are called Nephelometric Turbidity Units (NTU). The measuring apparatus (turbidometer) is calibrated and controlled with standard calibration samples, followed by measuring of the turbidity of the diluted NFC sample.

In the method, a nanofibrillar cellulose sample is diluted in water, to a concentration below the gel point of said nanofibrillar cellulose, and turbidity of the diluted sample is measured. Said concentration where the turbidity of the nanofibrillar cellulose samples is measured is 0.1%. HACH P2100 Turbidometer with a 50 ml measuring vessel is used for turbidity measurements. The dry matter of the nanofibrillar cellulose sample is determined and 0.5 g of the sample, calculated as dry matter, is loaded in the measuring vessel, which is filled with tap water to 500 g and vigorously mixed by shaking for about 30 s. Without delay the aqueous mixture is divided into 5 measuring vessels, which are inserted in the turbidometer. Three measurements on each vessel are carried out the mean value and standard deviation are calculated from the obtained results, and the final result is given as NTU units.

Rheometer Viscosity

The NFC is diluted with deionised water to a concentration of 0.5 w % and 200 g of the mixture is homogenised with a Büchi-mixer (B-400, max 2100 W, Büchi Labortechnik AG, Switzerland) for 3×10 s.

The viscosity of the NFC dispersions is measured at 22° C. with a stress controlled rotational rheometer (AR-G2, TA Instruments, UK) equipped with a narrow gap vane geometry (diameter 28 mm, length 42 mm) in a cylindrical sample cup having a diameter of 30 mm. After loading the samples to the rheometer they are allowed to rest for 5 min before the measurement is started. The steady state viscosity is measured with a gradually increasing shear stress (proportional to applied torque) and the shear rate (proportional to angular velocity) is measured. The reported viscosity (=shear stress/shear rate) at a certain shear stress is recorded after reaching a constant shear rate or after a maximum time of 2 min. The measurement is stopped when a shear rate of 1000 s-1 is exceeded. The method is used for determining zero-shear viscosity.

Brookfield Viscosity

The apparent viscosity of NFC is measured with a Brookfield viscometer (Brookfield viscosity) or another corresponding apparatus. Suitably a vane spindle (number 73) is used. There are several commercial Brookfield viscometers available for measuring apparent viscosity, which all are based on the same principle. Suitably RVDV spring (Brookfield RVDV-III) is used in the apparatus. A sample of the nanofibrillar cellulose is diluted to a concentration of 0.8% by weight in water and mixed for 10 min. The diluted sample mass is added to a 250 ml beaker and the temperature is adjusted to 20° C.±1° C., heated if necessary and mixed. A low rotational speed 10 rpm is used.

Target Properties

Typically in the method, the aim is to obtain, as the final product, nanofibrillar cellulose whose Brookfield viscosity, measured at a consistency of 0.8% and at a rotation speed of 10 rpm, is at least 5,000 mPa·s, advantageously at least 15,000. The viscosity is advantageously in the range of 5,000 to 40,000 mPa·s. The aqueous nanofibrillar cellulose dispersions obtained are also characterized by so-called shear thinning; that is, the viscosity decreases as the shear rate increases.

Furthermore, the aim is to obtain nanofibrillar cellulose whose turbidity is typically lower than 90 NTU, for example from 5 to 90 NTU, preferably from 10 to 60, at a consistency of 0.1 wt-% (aqueous medium), measured by nephelometry.

Furthermore, the aim is obtain shear thinning nanofibrillar cellulose having a zero shear viscosity ("plateau" of constant viscosity at small shearing stresses) in the range of 1,000 to 100,000 Pa·s, preferably 5,000 to 50,000 and a yield stress (shear stress where shear thinning begins) in the range of 1 to 50 Pa, advantageously in the range of 3 to 15 Pa, determined by rotational reometer at a consistency of 0.5 wt-% (aqueous medium).

In the definitions above, the consistencies refer to consistencies, at which the measurements are taken, and they are not necessarily consistencies of the product obtained by the method.

The above values can be attained with a pulp that is modified anionically or cationically, especially anionically modified pulp where the cellulose has been oxidized catalytically to convert alcohols to carboxyl groups, for example oxidized catalytically by N-oxyl mediation (such as the TEMPO catalyst), or where the cellulose is carboxymethylated. The degree of substitution of the oxidized cellulose is preferably 0.5-1.2 mmol COOH/g pulp, preferably 0.6-1.05 and most preferably 0.7-0.9 The degree of substitution of the carboxymethylated cellulose (on the scale of 0-3) is preferably 0.10-0.25.

Pulp where the internal bonds of the cellulose fibers are weakened in another way can also be used as starting material, such as enzymatically pretreated pulp or pulp which is pretreated by absorption of a chemical to cellulose.

Thanks to its rheological properties, fibril strength properties, as well as the translucency of the products made from it, the nanofibrillar cellulose obtained by the method can be applied in many uses, for example as a rheological modifier and a viscosity regulator, and as elements in different structures, for example as a reinforcement. Nanofibrillar cellulose can be used, among other things, in oil fields as a rheological modifier and a sealing agent. Similarly, nanofibrillar cellulose can be used as an additive in various medical and cosmetic products, as a reinforcement in composite materials, and as an ingredient in paper products. This list is not intended to be exhaustive, but nanofibrillar cellulose can also be applied in other uses, if it is found to have properties suitable for them.

The invention claimed is:

1. A method for producing nanofibrillar cellulose, wherein cellulose based fiber material in dispersion is processed for separating fibrils, the fiber material being pulp, the method comprising:
    a first step where the fiber material is supplied to a disperser, where the fiber material flows through several counter-rotating rotors in such a way that it is repeatedly subjected to shear and impact forces by the effect of different counter-rotating rotors to reduce the fiber material at least partly to nanofibrillar cellulose and in which fibrils or fibril bundles are separated from the fiber material, the resulting fiber material being non-homogeneous and including fiber fragments not disintegrated to fibrils; and
    a second step, where the fiber material obtained from the first step is supplied to a homogenizer without dilution, where it is subjected to homogenization by the effect of pressure,
    wherein the fiber material is treated at a consistency of 1-8 wt-% in the first step or in both the first and second steps and wherein the nanofibrillar cellulose has a fibril diameter smaller than about 200 nm.

2. The method according to claim 1, wherein in the first step, the fiber material is supplied through the several counter-rotating rotors outwards in radial direction with respect to a rotation axis of the rotors in such a way that the fiber material is repeatedly subjected to shear and impact forces by the effect of blades of the different counter-rotating rotors, whereby the fiber material is simultaneously fibrillated at least partly, wherein the fibrillation is effected by means of impact energy utilizing a series of frequently repeated impacts having varying directions of action.

3. The method according to claim 1, wherein in the second step, the homogenization pressure is 200 to 1000 bar.

4. The method according to claim 1, wherein in the first step, the passage of the fiber material through the disperser is repeated one or more times and/or in the second step, the passage of the fiber material through the homogenizer is repeated one or more times.

5. The method according to claim 1, wherein in the first step, the fiber material is passed through the disperser 1-3 times, and in the second step, the fiber material is passed through the homogenizer 1-3 times.

6. The method according to claim 1, wherein the nanofibrillar cellulose is produced continuously by passing the fiber material continuously through the disperser or dispersers connected in series and by passing the fiber material continuously through the homogenizer or homogenizers connected in series.

7. The method according to claim 1, wherein the fiber material is processed in the second step in the same consistency as obtained from the first step.

8. The method according to claim 1, wherein the fiber material is treated in the second step at a consistency of 1.5-6 wt %.

9. The method according to claim 1, wherein in the fiber material supplied to the first step, the internal bonds of the fiber have been weakened by chemical or enzymatic pretreatment.

10. The method according to claim 9, wherein the cellulose is anionically or canonically modified cellulose.

11. The method according to claim 9, wherein the cellulose is oxidized cellulose containing carboxyl groups.

12. The method according to claim 9, wherein the cellulose is carboxymethylated cellulose.

13. The method according to claim 1, wherein the nanofibrillar cellulose obtained from the second step has a Brookfield viscosity of at least 5,000 mPa·s, measured at a consistency of 0.8% and at 10 rpm.

14. The method according to claim 1, wherein the fiber material obtained from the second step has a turbidity value lower than 90 NTU, measured at a consistency of 0.1%.

15. The method according to claim 1, wherein the nanofibrillar cellulose obtained from the second step has a zero shear viscosity in the range of 1,000 to 100,000 Pa·s, and a yield stress in the range of 1 to 50 Pa, determined by a rotational reometer at a consistency of 0.5 wt %.

16. The method according to claim 1, wherein in the second step, the homogenization pressure is 300 to 650 bar.

17. The method of claim 16, wherein the homogenizer comprises an inlet and outlet for fiber material and between the inlet and outlet, a narrow through-flow gap, said homogenizer further comprising means configured to create pressure in the fiber material dispersion before said through-flow gap to cause shearing and impact forces on the fiber material dispersion flowing through said through-flow gap.

18. The method according to claim 1, wherein in the second step, the homogenization pressure is 310 to 450 bar.

19. The method of claim 1, wherein the fiber material is treated at a consistency of 2-5 wt-% in the first step or in both the first and second steps.

20. The method according to claim 19, wherein the fiber material is treated in the second step at a consistency of 2.5-4 wt %.

21. The method according to claim 1, wherein the nanofibrillar cellulose obtained from the second step has a Brookfield viscosity of at least 15,000 mPa·s, measured at a consistency of 0.8% and at 10 rpm.

22. The method according to claim 1, wherein the nanofibrillar cellulose obtained from the second step has turbidity value of 5 to 90 NTU, measured at a consistency of 0.1%.

23. The method according to claim 1, wherein the nanofibrillar cellulose obtained from the second step has a zero shear viscosity in the range of 5,000 to 50,000, and a yield stress in the range of 3 to 15 Pa, determined by rotational reometer at a consistency of 0.5 wt %.

24. The method of claim 1, wherein an outlet of the disperser is directly connected to an inlet of the homogenizer such that the fiber material exiting the disperser is directly conveyed to the homogenizer.

25. The method of claim 1, Wherein the homogenizer comprises an inlet and outlet for fiber material and between the inlet and outlet, a narrow through-flow gap, said homogenizer further comprising means configured to create pressure in the fiber material dispersion before said through-flow gap to cause shearing and impact forces on the fiber material dispersion flowing through said through-flow gap.

26. A device for producing nanofibrillated cellulose from cellulose-based fiber material, comprising:
  a disperser comprising an inlet and outlet for fiber material and between the inlet and outlet, several counter-rotating rotors configured to subject fiber material dispersion repeatedly to shear and impact forces by the effect of different counter-rotating rotors;
  a homogenizer comprising an inlet and outlet for fiber material and between the inlet and outlet, a narrow through-flow gap, said homogenizer further comprising means configured to create pressure in fiber material dispersion before said through flow gap to cause shearing and impact forces on the fiber material dispersion flowing through said through-flow gap; and
  the outlet of the disperser being directly connected to the inlet of the homogenizer such that the fiber material exiting the disperser is directly conveyed to the homogenizer,
  wherein the nanofibrillated cellulose has a fibril diameter smaller than about 200 nm.

27. The device according to claim 26, wherein the device comprises two dispersers connected in series and the outlet of the last disperser is directly connected to the inlet of a homogenizer or to the inlets of homogenizers connected in parallel.

* * * * *

UNITED STATES PATENT AND TRADEMARK OFFICE
CERTIFICATE OF CORRECTION

PATENT NO. : 10,808,356 B2
APPLICATION NO. : 14/890392
DATED : October 20, 2020
INVENTOR(S) : Markus Nuopponen et al.

It is certified that error appears in the above-identified patent and that said Letters Patent is hereby corrected as shown below:

In the Claims

At Column 14, Line 51 (Claim 10, Line 2), please delete "canonically" and insert --cationically-- therefor.

At Column 16, Line 1 (Claim 25, Line 1), please delete "Wherein" and insert --wherein-- therefor.

Signed and Sealed this
Twenty-ninth Day of December, 2020

Andrei Iancu
*Director of the United States Patent and Trademark Office*